US012600001B2

(12) United States Patent
Mikowychok

(10) Patent No.: US 12,600,001 B2
(45) Date of Patent: Apr. 14, 2026

(54) APPARATUS FOR CATCHING DEBRIS AND DEFLECTING COOLANT SPLASH FOR USE WITH COMPUTER NUMERICAL CONTROLLED MACHINES

(71) Applicant: Frank Mikowychok, Lincoln, CA (US)

(72) Inventor: Frank Mikowychok, Lincoln, CA (US)

( * ) Notice: Subject to any disclaimer, the term of this patent is extended or adjusted under 35 U.S.C. 154(b) by 395 days.

(21) Appl. No.: 18/534,675

(22) Filed: Dec. 10, 2023

(65) Prior Publication Data

US 2025/0187128 A1      Jun. 12, 2025

(51) Int. Cl.
B23Q 11/00       (2006.01)
B23B 7/10       (2006.01)
(Continued)

(52) U.S. Cl.
CPC ............ B23Q 11/0067 (2013.01); B23B 7/10 (2013.01); B23Q 11/0053 (2013.01); B23Q 11/0075 (2013.01); B23Q 11/08 (2013.01); B23Q 11/0891 (2013.01); B23Q 11/1069 (2013.01); B23B 11/00 (2013.01); Y10S 29/077 (2013.01);
(Continued)

(58) Field of Classification Search
CPC . Y10S 29/079; Y10S 82/901; B23Q 11/0067; B23Q 11/08; B23Q 11/0891; B23Q 11/0042–0078; B23Q 11/1069; B23B 7/10; Y10T 409/30392; Y10T 409/304088; Y10T 83/242; Y10T 408/50–51; B24B 55/04; B24B 55/06; B24B 55/12; B23D 59/006–59/0064; A47B 88/963; A47B 88/00–88/994; A47B 2210/00–2210/19

USPC ............ 29/DIG. 79; 409/134; 451/451, 453; 82/901; 83/168; 408/67–68; 312/330.1–348.6
See application file for complete search history.

(56) References Cited

U.S. PATENT DOCUMENTS

| 4,156,549 | A | * | 5/1979 | Clark | ................... | A47B 88/941 |
| | | | | | | 312/270.3 |
| 4,555,874 | A | * | 12/1985 | Chung | ................... | B24B 55/06 |
| | | | | | | 451/456 |

(Continued)

FOREIGN PATENT DOCUMENTS

| CN | 108098008 A | * | 6/2018 |
| CN | 114147535 A | * | 3/2022 |

(Continued)

*Primary Examiner* — Erica E Cadugan
(74) *Attorney, Agent, or Firm* — Whitley Legal Group, PC; AnnMarie W Whitley

(57)       ABSTRACT

A deflector apparatus catches debris and deflects coolant spray in a coolant collection area of machine tools having an extended drawtube or bar feed area such as CNC lathes. The deflector apparatus encloses the coolant collection area by covering the opening or access to the area with a door and attached basket. The basket extends into the coolant collection area at an incline relative to the door and interrupts coolant and debris entering the coolant collection area from the drawtube, causing the debris to collect within the basket and allowing coolant to filter through a grate positioned on a lower surface of the basket. A flange with an outer seal extends along part of the lower edge of the door to create a seal between the door and the opening to the coolant collection area. Additional features include a locking mechanism, handle, and reinforcement plate.

20 Claims, 8 Drawing Sheets

(51) Int. Cl.

| | | |
|---|---|---|
| *B23Q 11/08* | (2006.01) | |
| *B23Q 11/10* | (2006.01) | |
| *B23B 11/00* | (2006.01) | |

(52) U.S. Cl.
CPC ............ *Y10S 29/079* (2013.01); *Y10S 29/094* (2013.01); *Y10S 82/90* (2013.01); *Y10S 82/901* (2013.01); *Y10T 29/5109* (2015.01)

(56) References Cited

U.S. PATENT DOCUMENTS

| | | | | |
|---|---|---|---|---|
| 4,955,770 A | * | 9/1990 | Kitamura ........... | B23Q 11/0875 409/137 |
| 5,294,194 A | * | 3/1994 | Lombardo .............. | A47L 13/52 312/308 |
| 6,571,838 B1 | * | 6/2003 | Chiang .............. | B23Q 11/0057 83/167 |
| 7,387,478 B2 | * | 6/2008 | Anderson .......... | B23Q 11/0067 409/134 |
| 8,100,486 B2 | * | 1/2012 | Veltrop ................... | A47B 88/40 312/402 |
| 9,004,829 B1 | * | 4/2015 | Lodge ................ | B23Q 11/0067 409/137 |
| 2011/0192262 A1 | * | 8/2011 | Loveless .............. | B23D 59/006 55/482 |
| 2019/0358759 A1 | * | 11/2019 | Gao ................... | B23Q 11/0067 |
| 2022/0371140 A1 | * | 11/2022 | Matsui ............... | B23Q 11/0067 |
| 2026/0021547 A1 | * | 1/2026 | Kuroda .............. | B23Q 11/0067 |

FOREIGN PATENT DOCUMENTS

| | | | | |
|---|---|---|---|---|
| CN | 118595887 A | * | 9/2024 | |
| JP | 10-202463 A | * | 8/1998 | |
| WO | WO-2021/033430 A1 | * | 2/2021 | |

* cited by examiner

FIG. 11
FIG. 12
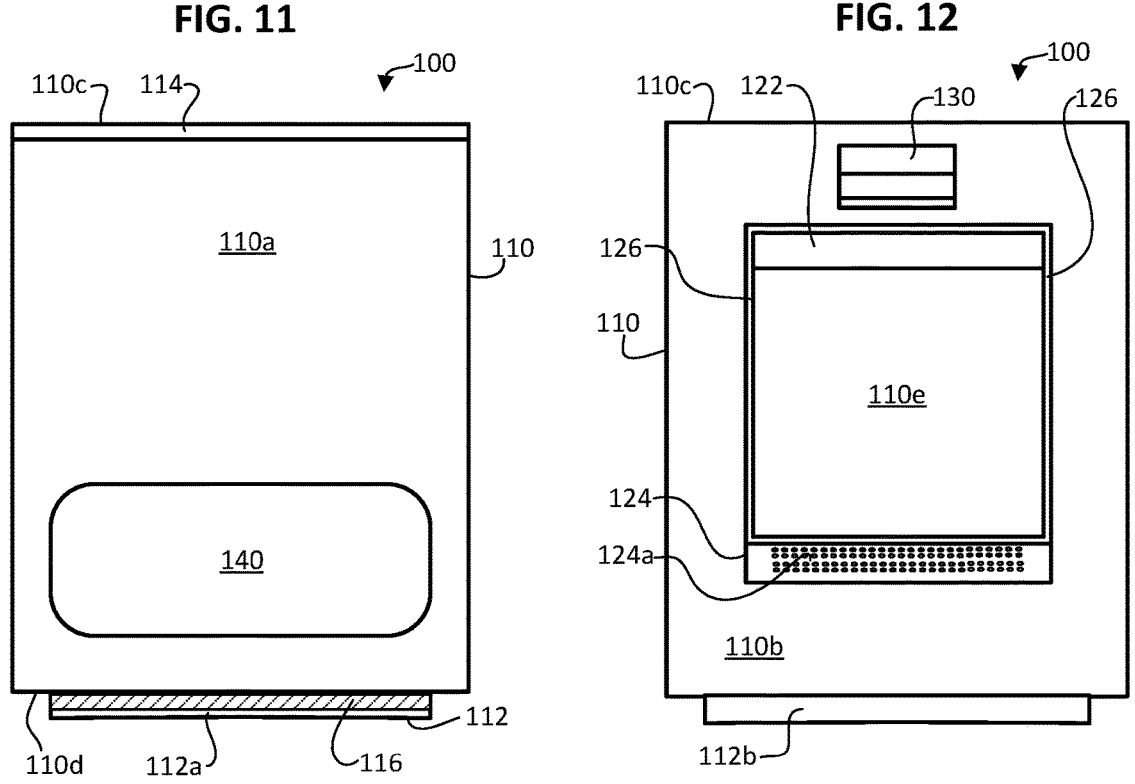
FIG. 13
FIG. 14
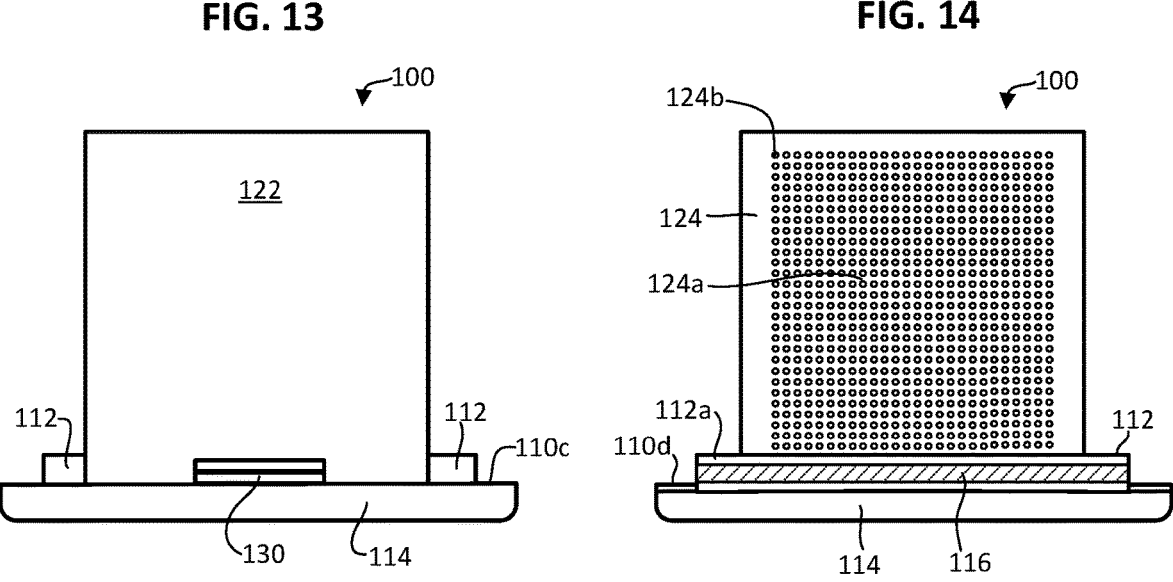

110c
114
130
100

110

126

A

120

110d 116    112

B 18
114    110c

130

110

50

126

140

120

116

112

30

20

126j
126n

126

126m    126k

122j

122

122m 122j    122n 124k
124m

124

124k    124n

FIG. 22
FIG. 23
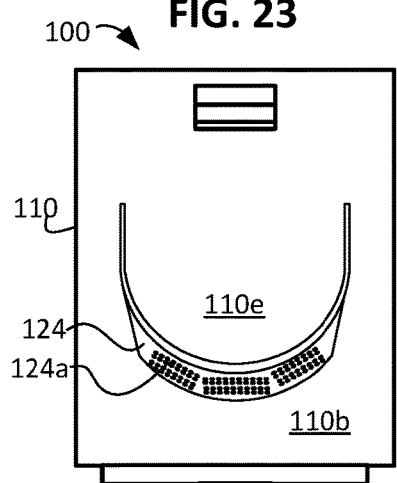
FIG. 24
FIG. 25
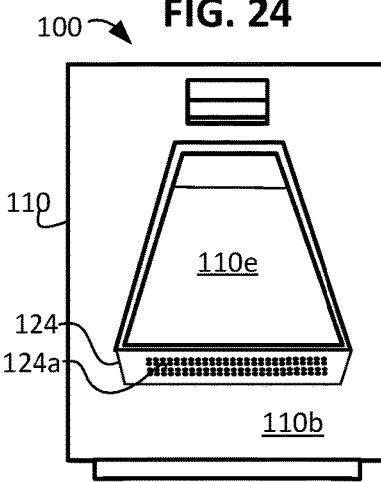
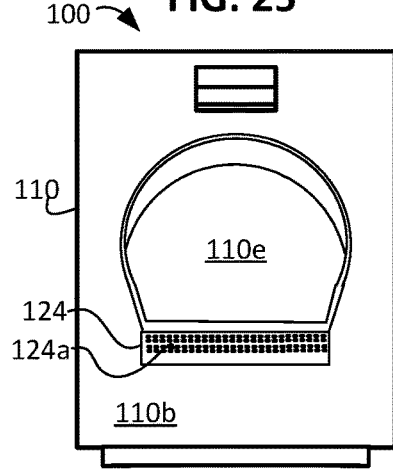
FIG. 26
FIG. 27
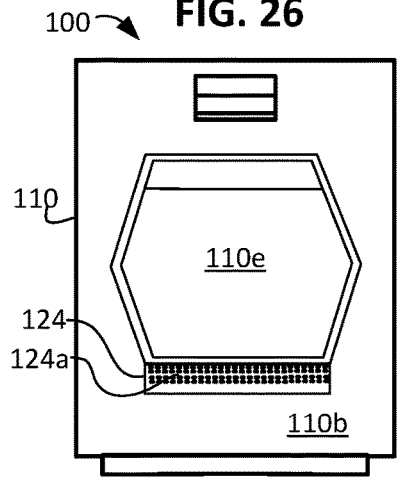
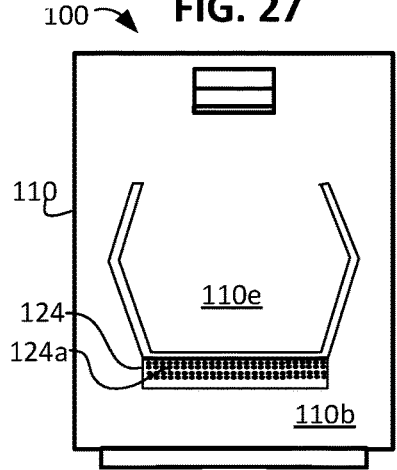

APPARATUS FOR CATCHING DEBRIS AND DEFLECTING COOLANT SPLASH FOR USE WITH COMPUTER NUMERICAL CONTROLLED MACHINES

FIELD OF THE INVENTION

The present invention relates to machine tools and computer numerical controlled machining and more particularly to a deflector apparatus useful for deflecting coolant splash and catching debris in a coolant collector box or drawtube or bar loading area.

BACKGROUND OF THE INVENTION

Computer numerical controlled (CNC) machines offer precision manufacturing using core-programmed computer software. As a result, CNC machining has improved manufacturing efficiency and accuracy, sped up production, improved safety, and reduced operating costs. Using CNC machines, manufactures can create made-to-order parts and deliver them on demand. Today, CNC machines are widely used across many industries, including automotive, aerospace, medical, agriculture, construction, dental, firearms, electronics, metalwork, publishing, production, manufacturing, transportation, hospitality, and woodwork.

Among CNC machines are CNC lathes, which specialize in CNC turning machining, including taper turning, hard turning, spherical generation, facing, cutting off, knurling, drilling, grooving, and similar manufacturing processes. With computerized controls, the CNC lathe rotates a table or moves a workpiece in different planes while using cutting tools to remove material from the workpiece during the CNC milling process. By converting a three-dimensional computer aided design (CAD) or CAD model into a series of computer instructions, the CNC milling process is automated including operation of the machine and tooling and movement of the workpiece.

For CNC lathes, the power of the motor and dimensions of the headstock determine how large of a workpiece the CNC lathe can accommodate. The headstock contains the main drive, bearings, and gears, houses the motor, and supports the main spindle, all of which must be sufficiently sized and configured to accommodate the pre-machined workpiece and to carry significant and disruptive loads. Several different types of chucks can be used to grip the workpiece, attaching it to the headstock and keeping it centered. Standing opposite of the headstock, the tailstock also supports the tailstock quill as well as the workpiece and, a centering tool, drill chuck, or larger drill bit often with a Morse taper shank for drilling directly into the workpiece's end. The tools used during CNC machining are held by the tool turret in an operational position, ready to be rotated into a cutting position as needed. Foot pedals are often present to allow the operator to lock and unlock the chuck or act as a safety stop. Operator controls allow the operator to adjust the tool's operational characteristics and cutter positions and to load or edit programs stored in the CNC lathe's memory. CNC lathes optionally also include extended drawtubes or bar feeders, upgraded coolant systems that improve the quality of the metal cutting operations, or full enclosures or silencer hoods that improve the environment around the machine, reducing coolant splash and protecting workers from injury.

The CNC lathe operates according to instructions loaded onto its memory to reduce a workpiece from a pre-machined state to a product automatically. It engages the machinehoused tools to cut away parts of the workpiece, preferably with through-spindle coolant. As the workpiece is reduced, metal shavings, swarfs, turnings, dust, debris, or chips are produced around the workpiece and within bores and other cavities in the workpiece. Ideally, any chips produced are ideally funneled to specific collection areas within the CNC machine. One area where chips accumulate is in the coolant collection area or box beneath the spindle assembly. The coolant collection area is designed to collect used coolant and redirect it back to the coolant tank to be used again. Unfortunately, chips and debris can build up in the collection area, where they can be difficult to remove or may block the drain. Regular cleaning is needed, and although chip baskets and conveyors can be positioned to collect and remove chips, they do not reach all areas where chips collect such as the coolant collection area. Additionally, upgrades such as chip conveyors require a larger workspace and add additional expense and upkeep.

Because keeping a CNC machine free of debris can prevent damage and improve machine performance and prevent coolant spills and floods onto the floor, it would be desirable to provide a debris collection and splash control or deflection apparatus. It would be further desirable to provide such an apparatus that can be used where coolant collects and is recycled. Additionally, it would be desirable to provide such an apparatus that can be easily removed, emptied, and replaced. Such a debris collector and splash deflector would be a notable advance in the machining arts.

BRIEF SUMMARY OF THE INVENTION

A debris collector and splash deflector enhances turning machines, CNC machines, and CNC lathes that produce debris such as metal shavings, swarfs, turnings, dust, residue, chips, and other byproducts during machining. The debris can accumulate in the coolant collection area or box of the CNC machine as coolant is collected and recycled for reuse. Unfortunately, the debris can be difficult to remove from the coolant collection area and can cause problems if it builds up. Accordingly, the access opening for the coolant collection area can be covered with the deflector apparatus of the present invention.

The deflector apparatus for catching or collecting debris and deflecting or controlling coolant slash replaces or serves as the door or enclosure for the typically large access opening for the coolant collection area. The deflector apparatus includes a door with a preferably integrally formed handle along its upper edge and flange integrally formed with the door's lower edge. Attached to the underside of the flange is a seal, which extends into the coolant collection area and serves as the resting surface for the door when it is in use and as a seal to prevent debris from exiting the coolant collection area during machine operation. Attached to the inner surface of the door is a basket for collection debris. The basket fixedly attaches to the door and extends at an incline from the door to the conduit of coolant and debris, which is the spindle assembly for a CNC lathe. The basket serves to deflect or control the coolant spray as it exits the drawtube and spindle assembly at high revolutions per minute and to collect unwanted debris. Preferably, the basket is inclined at an angle of 10 degrees relative to the horizon or the ground. Preferably, the door and basket are made of sheet metal.

The basket is preferably shaped like a parallelepiped with five closed sides and one open side. The open side receives the conduit of coolant and debris, while the five closed sides are formed by walls extending from the door and a fifth wall that is formed by part of the door. The lowest wall of the basket includes a grate that allows coolant to pass therethrough while keeping debris within the basket. Although a parallelepiped shape is preferred due to its ease of manufacturing, other basket shapes can be substituted as long as they are sized and configured to receive the conduit of coolant and debris and further configured with a grate along a lower surface to allow for coolant to exit the basket.

Positioned on the inner surface of the door of the deflector apparatus is a locking mechanism that holds the debris collector in position when installed on the CNC machine. Locking mechanisms will vary depending on the CNC machine and coolant collection area configuration. In one embodiment, the locking mechanism can be a lock extension that attaches in part to the door and extends in part at a spaced distance relative to the door such that it can slip over an edge of a vertical surface. Accordingly, the lock extension can be inserted into a lock opening in the housing above the coolant collection area of the CNC machine and then lowered into a position where the housing wall rests between a portion of the lock extension and the debris collector door.

Optionally and preferably positioned on the outer surface of the door of the deflector apparatus are one or more reinforcing plates. Each reinforcing plate is sized and positioned to counteract any force and stress imparted on the door by the basket attached to the inner surface of the door. Preferably, a single reinforcing plate is secured to the outer surface of the door of the deflector apparatus at a position near where the lower surface of the basket attaches to the door of the debris collector. More preferably, it is sized to counteract the weight of the basket when it has been filled with debris and further can act as a reinforcement should debris need to be forcefully removed from the basket by pounding, scraping, or other means.

To use the deflector apparatus, a machine operator installs it at the opening to coolant collection area of a CNC machine. Once installed, the machine operator can machine a workpiece according to the operational and safety instructions of the CNC machine. When finished or when concerned that significant debris has accumulated in the basket of the deflector apparatus, the machine operator optionally and preferably flushes remaining debris from the drawtube and spindle assembly using a jet of coolant from an auxiliary hose to prevent new material from collecting and obstructing operation of the machine, preferably turns off CNC machine, and carefully removes the debris collector. The basket of the deflector apparatus then can be emptied into a waste or recycling receptacle and optionally additionally flushed out with water or air. After emptying the basket of the deflector apparatus, the machine operator can reinstall the deflector apparatus on the CNC machine for its next operation. Using the deflector apparatus allows a machine operator to remove unwanted debris easily and efficiently from the coolant collection area.

BRIEF DESCRIPTION OF THE DRAWINGS

Figures 8, 9, 10:
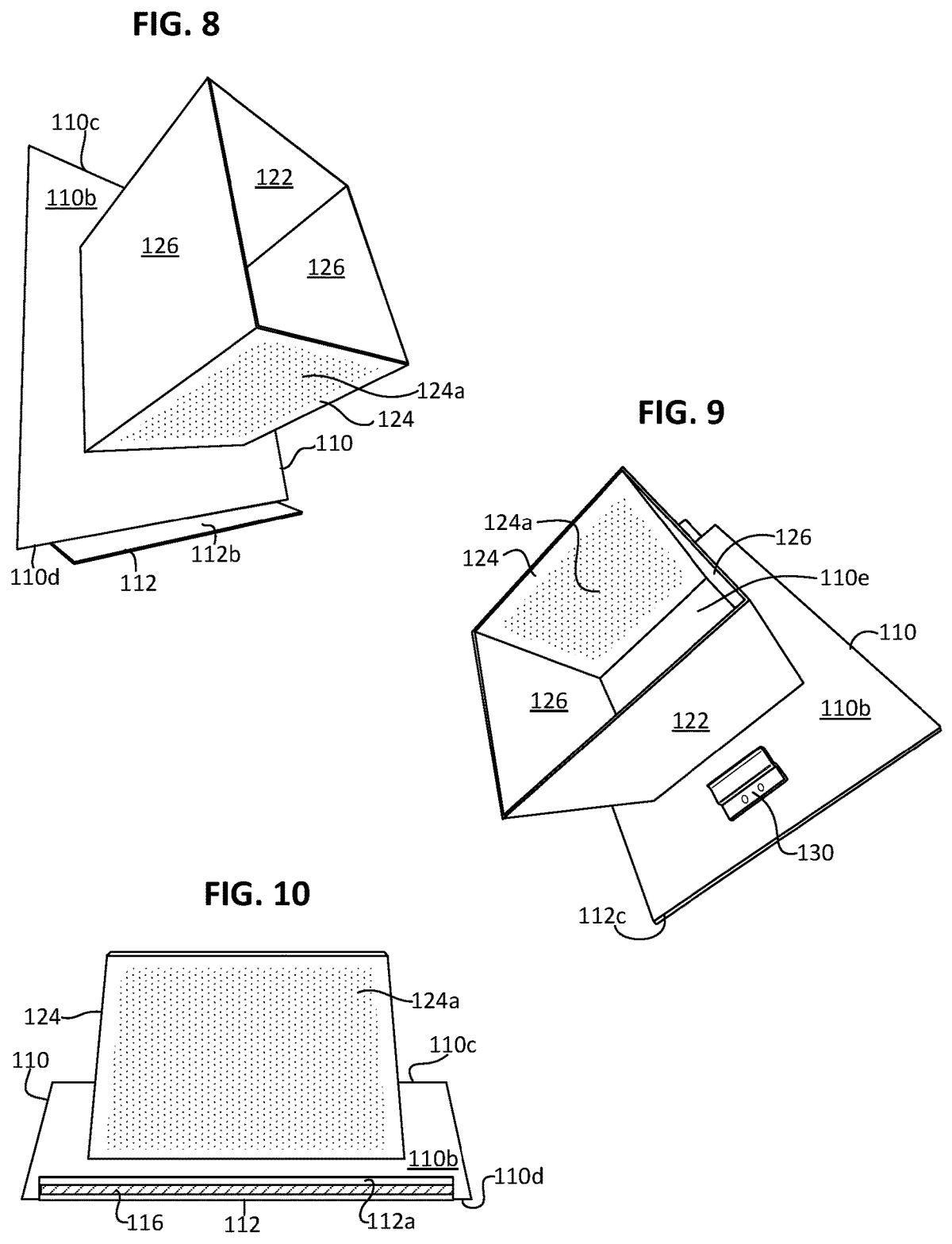

FIG. 8 is a perspective view from below the deflector apparatus of the preferred embodiment of the present invention.

FIG. 9 is a perspective view from above the deflector apparatus of the preferred embodiment of the present invention.

FIG. 10 is a second perspective view from below the deflector apparatus of the preferred embodiment of the present invention.

FIG. 11 is a front view of the deflector apparatus of the preferred embodiment of the present invention.

FIG. 12 is a back view of the deflector apparatus of the preferred embodiment of the present invention.

FIG. 13 is a top view of the deflector apparatus of the preferred embodiment of the present invention.

FIG. 14 is a bottom view of the deflector apparatus of the preferred embodiment of the present invention.

FIG. 22 is a back view of the deflector apparatus according to a first alternate second embodiment of the present invention.

FIG. 23 is a back view of the deflector apparatus according to a second alternate second embodiment of the present invention.

FIG. 24 is a back view of the deflector apparatus according to a third alternate second embodiment of the present invention.

FIG. 25 is a back view of the deflector apparatus according to a fourth alternate second embodiment of the present invention.

FIG. 26 is a back view of the deflector apparatus according to a fifth alternate second embodiment of the present invention.

FIG. 27 is a back view of the deflector apparatus according to a fifth alternate second embodiment of the present invention.

For a better understanding of the invention reference is made to the following detailed description of the preferred embodiments of the invention which should be taken in conjunction with the above-described drawings.

DETAILED DESCRIPTION OF THE INVENTION

The present invention, as shown in FIGS. 1-21, is an apparatus 100 for catching or collecting debris and deflecting or controlling coolant splash that is useful with turning machines, CNC machines, and CNC lathes 10. The preferred embodiment as shown and described herein is sized to cooperate with the ST Series high-performance turning centers from HAAS Automation, Inc. of Oxnard, California such as the ST-15Y. For simplicity, a CNC lathe 10 is generally described herein, but persons skilled in the art of machining will understand how deflector apparatus 100 can similarly be used with CNC machines from other manufacturers and with other CNC machines that have extended loading areas, lathes, and machines where unwanted or undesirable debris collects during machining. Debris as used herein refers to all types of metal shavings, swarfs, turnings, dust, residue, chips, and other byproducts produced during machining.

Figure 1:
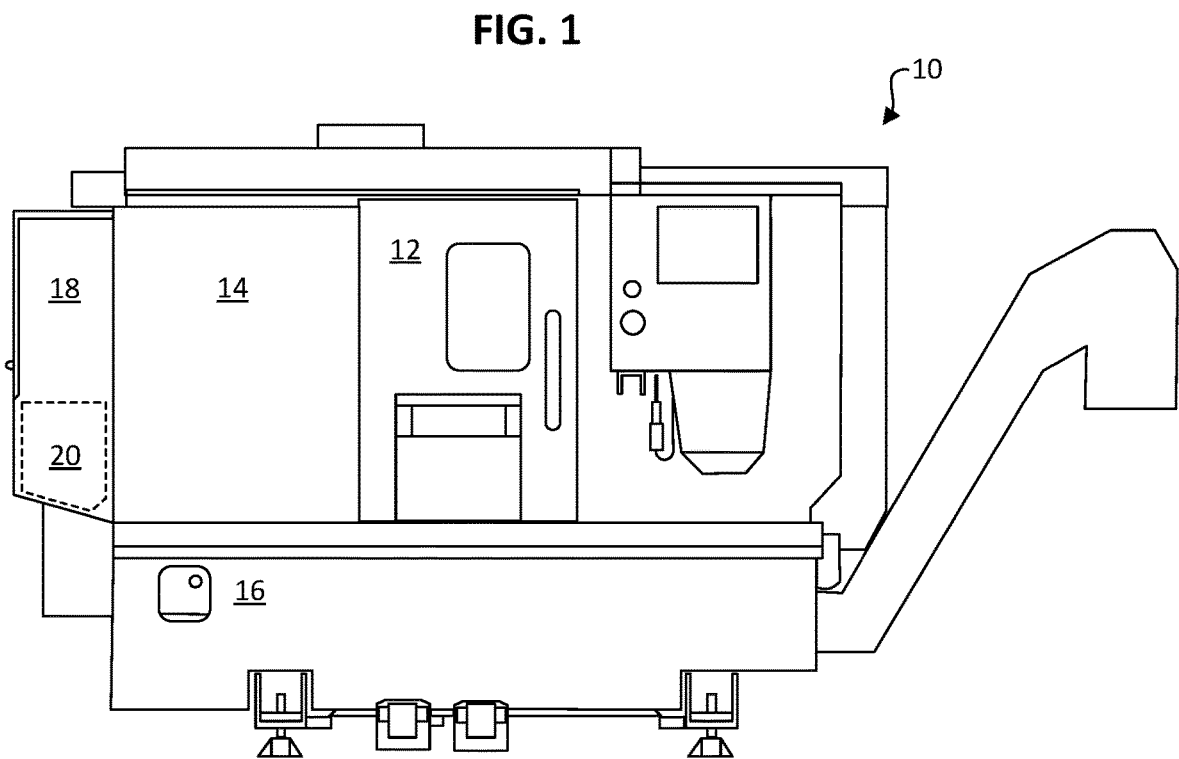
FIG. 1 is a side view of a CNC turning machine with the deflector apparatus of the present invention installed thereon.
Figure 2:
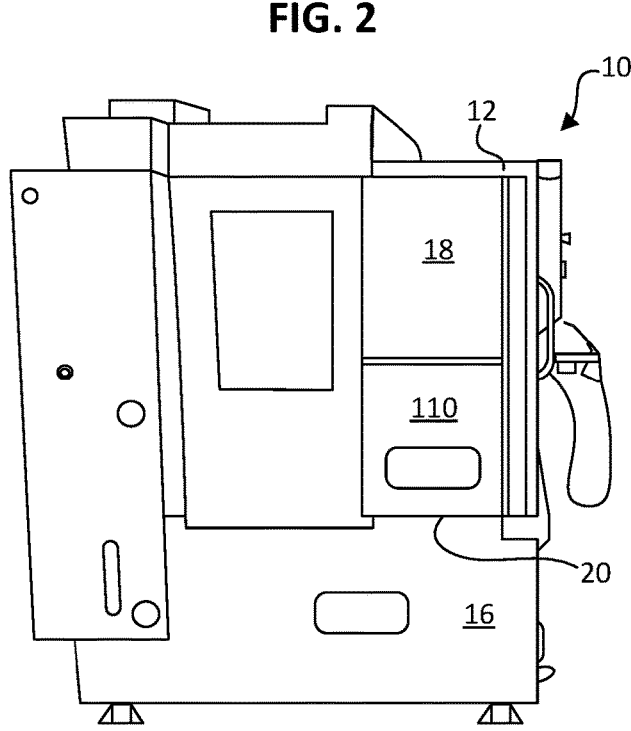
FIG. 2 is an end view of the CNC turning machine with the deflector apparatus of the present invention installed thereon.
Figure 3:
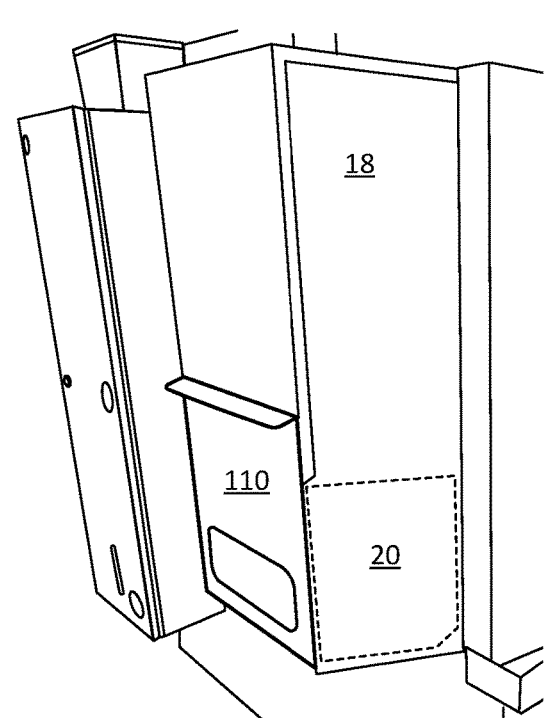
FIG. 3 is a perspective view of a portion of the CNC turning machine with the deflector apparatus of the present invention installed thereon.

FIGS. 1-6 illustrate a CNC lathe 10 having a coolant collection area 20 positioned to receive coolant exiting a lathe spindle 30. As shown in FIG. 1, workpieces are machined behind door 12 and many critical components such as the spindle assembly 30 and hydraulic power unit (not shown), sit fully or partially behind panels 14 and 16. In the example shown, the spindle motor (not shown) sits within housing 18 above coolant collection area 20 and the exit end 30a of the spindle assembly 30. Coolant collection area 20 can be accessed by removing an enclosure or door, which as shown herein is a deflector apparatus 100 for catching or collecting debris and deflecting or controlling coolant splash.

Figure 4:
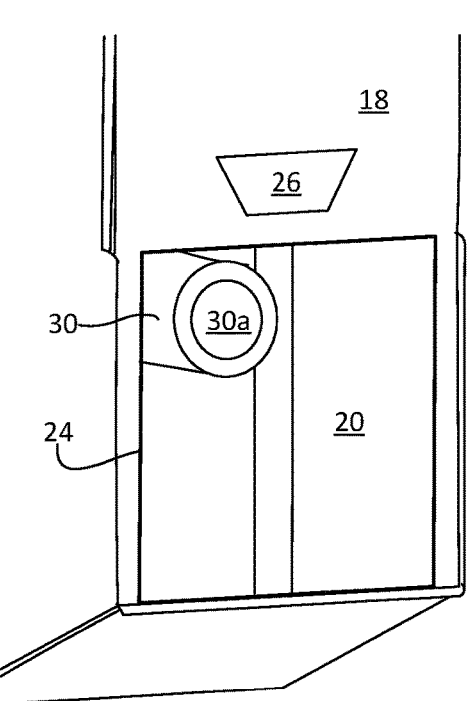
FIG. 4 is a perspective view of the coolant collector area of the CNC turning machine that receives the deflector apparatus of the present invention installed.
Figure 5:
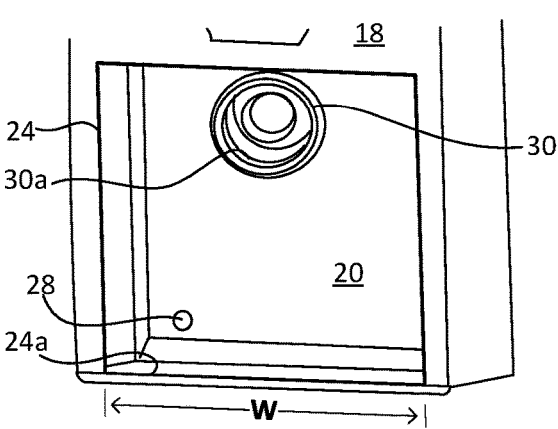
FIG. 5 is a second perspective view of the coolant collector area of the CNC turning machine that receives the deflector apparatus of the present invention installed.
Figure 6:
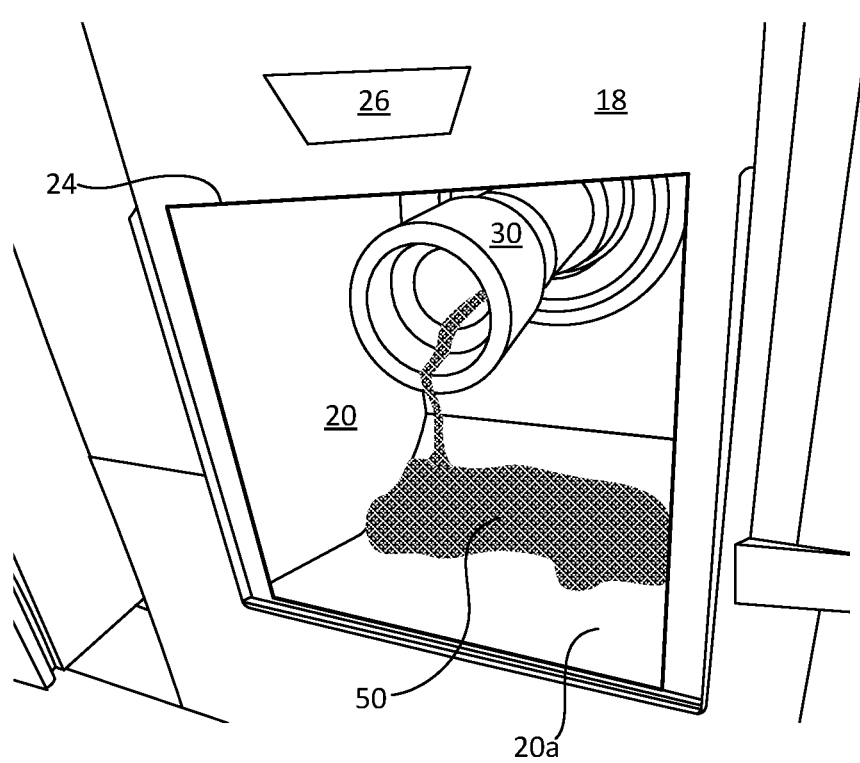
FIG. 6 is a third perspective view of the coolant collector area of the CNC turning machine that receives the deflector apparatus of the present invention installed further illustrating how debris accumulates when no deflector apparatus is present.

FIGS. 4-6 illustrate the cooling collection area 20 of CNC lathe 10. As shown, housing 18 cooperates with spindle assembly 30 such that anything exiting from the exit end 30A of spindle assembly 30 is deposited in coolant collection area 20. The space that makes up cooling collection area 20 can be accessed through a large first opening 24 in housing 18. Without deflector apparatus 100, debris 50 settles within coolant collection area 20 and coolant is funneled to a drain, which directs the coolant back to the main coolant reservoir to be reused. Optionally but preferably, housing 18 also includes a second opening 26 that supports or cooperates with doors or enclosures for covering large opening 24. Second opening 26 is also known as the lock opening 26.

Figure 7:
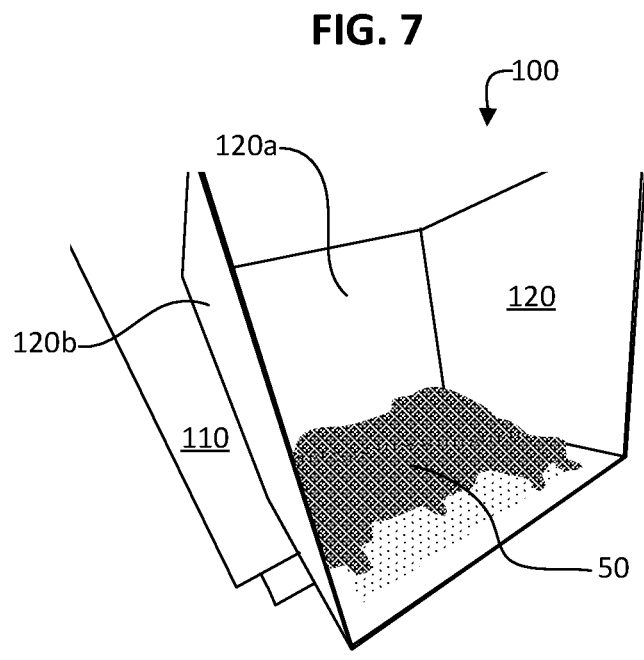
FIG. 7 is a perspective view of the deflector apparatus of the preferred embodiment of the present invention further illustrating how debris accumulates in the deflector when installed in the coolant collection area of the CNC turning machine.
Figures 15A, 15B, 16A, 16B, 16C:
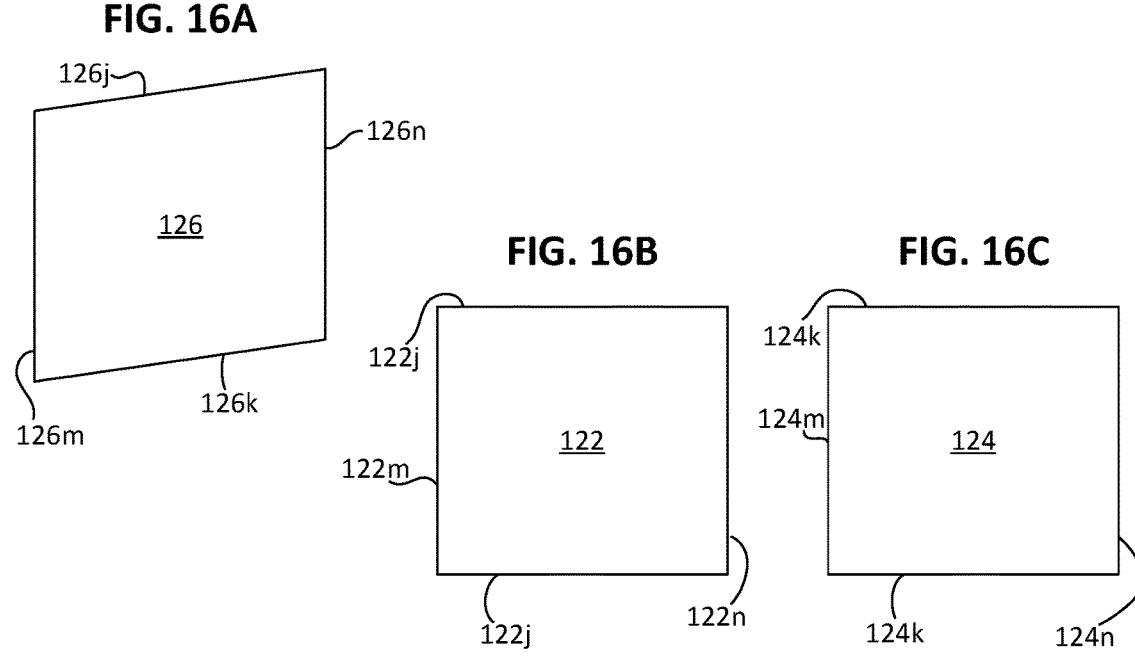
FIG. 15A is a side view of the deflector apparatus of the preferred embodiment of the present invention.
FIG. 15B is a side view of the deflector apparatus of the preferred embodiment of the present invention positioned to cooperate with the coolant collection area of the CNC turning machine.
FIG. 16A is an illustration of the side walls of the deflector apparatus of the preferred embodiment of the present invention.
FIG. 16B is an illustration of the upper wall of the deflector apparatus of the preferred embodiment of the present invention.
FIG. 16C is an illustration of the lower wall of the deflector apparatus of the preferred embodiment of the present invention.

FIGS. 7-21 illustrate the preferred embodiment of deflector apparatus 100, which serves as the door or enclosure for the large first opening 24 of housing 18. When positioned at and within first opening 24, a basket 120 extends into coolant collection area 20 such that it can control or deflect coolant splash coming from spindle assembly 30 and collects debris 50 thereby preventing debris 50 from settling near drain 28 and the bottom of coolant collection area 20. FIG. 7 illustrates how debris 50 accumulates in basket 50, and FIG. 15B illustrates how basket 120 extends into coolant collection area 20 at an angle to interrupt the flow of debris 50 and coolant exiting from spindle assembly 30.

The components of deflector apparatus 100 are partly or wholly made from sheet metal. The sheet metal preferably has a thickness of about 1/16 inches or 0.06 inches. FIGS. 7-10 provide several examples of an assembled deflector apparatus 100, which preferably includes a door 110 with a lower flange 112 and upper handle 114, basket 120, a lock extension 130, and a seal 116 under lower flange 112. Basket 120 has an upper wall 122, lower wall 124 with a strainer or grate 124a, and two opposing side wall 126. Basket 120 attaches to door 110 along its inner surface 110b such that door 110 forms an additional door wall 110e. One or more reinforcing plates 140 optionally can be secured to the outer surface 110a of door 110 as well. To enclose coolant collection area 20 and cover opening 24, door 110 can be positioned substantially vertically as shown, wherein substantially vertically or in a substantially vertical orientation includes being oriented perpendicular to the ground or horizon and being oriented at an angle between 45 degrees and 90 degrees relative to the ground or horizon. Moreover, in some configurations, door 110 may be positioned substantially vertically if door includes multiple sections wherein at least one section is vertically oriented between 45 degrees and 90 degrees relative to the ground or horizon.

In the preferred embodiment of basket 120 and as shown in the figures, upper wall 122, lower wall 124, and side walls 126 are planar and attach to form four sides of a parallelepiped that is bound on one end by a section 110e of door 110 while open at the end opposite of door 110, along a surface that may be parallel to door 110. While shown herein as a parallelepiped basket with upper. Lower, and side walls 122, 124, and 126 that create a square cross section, fewer or additional walls can be substituted and otherwise configured to have other cross sections without changing the scope of the invention. For example, a singular wall can be formed into a shape having a bowl, circular, or oval cross section. Likewise, additional walls can be added to create a shape having a hexagonal or multi-side cross section, or two or three walls can be attached to create a shape having triangular or irregular cross section. FIGS. 22-27 illustrate a few examples of how basket 120 can vary in shape and cross section. With any basket shape, the walls can be integrally formed or configured from multiple components that are attached together. Preferably, where sheet metal components comprise basket 120 components and door 110, individual sheet metal components are joined by spot weld, rivet, or solder.

In the preferred embodiment, basket 120 and door 110 are attached such that basket 120 extends at an incline or angle upwards from an inner surface 110b of door 110. FIGS. 7, 15A, and 15B illustrate the preferred angular relationship between basket walls 122, 124, and 126 and door 110. Importantly, the lower wall 124, or lower surface for shapes other than a parallelepiped, should be attached to door 110 at an angle sufficient to collect debris 50 in basket 120 while still able to be easily inserted or removed from coolant collection area 20 through first opening 24 and positioned around or under the exit end 30a of spindle assembly 30. In the preferred embodiment, basket lower wall 124 is substantially planar and angled at an incline of 10 degrees from the horizon or ground as it extends from door 110 toward spindle assembly 30, which is shown by angle A in FIG. 15. FIG. 15B illustrates how debris 50 collects up against door 110 in the lowest area of basket 120 because of the angular relationship between the basket walls and door 110. The term "substantially" as used herein is intended as a modifier that means approximately or that allows for small or insignificant deviations from perfection.

In the preferred embodiment, basket 120 further includes a strainer or grate 124a that preferably fits into or is formed within lower wall 124. More preferably, grate 124a covers a large section or the entirety of lower wall 124 and is a series or plurality of openings that extend from the cavity 120a formed by basket 120 to the outer surface 120b of basket 120. The openings should be large enough to allow coolant to pass therethrough but small enough to prevent debris from passing therethrough. Accordingly, any fluid exiting the spindle assembly can drain through the grate 124a of basket 120 to get to the coolant collection area drain 28 while debris 50 is trapped inside basket 120. In the preferred embodiment, the plurality of openings 124b that form grate 124a are centered on lower wall 124 with a 0.5 inch-0.6 inch margin surrounding them on each side of lower wall 124. There are preferably 625 openings 124b, each of which is preferably circular with a diameter preferably between 0.070 inches and 0.090 inches, and the openings 124b are preferably spaced at regular intervals of about 0.28 inches-0.3 inches from each other. More preferably, grate openings 124b have a diameter of 0.080 inches. Although circular openings are preferred, openings 124b can have other shapes or be otherwise configured without changing the scope of the invention as long as they allow coolant to flow through while discouraging debris from passing through or becoming lodged therein.

With the preferred embodiment of basket 120, side walls 126 are substantially planar and have an open edge 126n, a door edge 126m, an upper edge 126j, and a lower edge 126k as shown in FIG. 16C. Upper wall 122 is also substantially planar and has an open edge 122n, a door edge 122m, and opposing side edges 122j as shown in FIG. 16B. Likewise, substantially planar lower wall 124 has an open edge 124n, a door edge 124m, and opposing side edges 124k as shown in FIG. 16C. are positioned at opposing edges of lower wall 124. Each side edge 122j of the upper wall 122 attaches to the upper edge 126j of one of the side walls 126 such that side walls 126 preferably are positioned on opposite edges 122j of upper wall 122 and extend substantially parallel to one another. Each side edge 124k of the lower wall 124 attaches to the lower edge 126k of one of the side walls 126 such that upper wall 122 and lower wall 124 are substantially parallel to one another. The door edges 122m, 124m, and 126m of upper wall 122, lower wall 124 and side walls 126 respectively form a square shape in the preferred embodiment when assembled. The door edges 122m, 124m, and 126m attach to the inner side 110b of door 110, and the area of the inner surface of door 110 that is surrounded by the door edges of 122m, 124m, and 126m becomes a fifth wall of basket 120, which is referred to herein as the door wall 110e. The open edges 122n, 124n, and 126n of upper wall 122, lower wall 124, and side walls 126 respectively also form a square shape in the preferred embodiment when assembled, which is referred to herein as the basket opening (not labelled) and serves as the opening to a basket cavity (not labelled) that is surrounded by the upper wall 122, lower wall 124, and side wall 126. The basket opening and basket cavity receive part of spindle assembly 30 when debris deflector 100 is installed on CNC machine 10.

In the preferred embodiment, door 110 is rectangular in shape with upper edge 110c and lower edge 110d that are about 12.75 inches in length and side edges (not labelled) that approximately 15 inches in length. Along upper edge 110c of door 110 is door handle 114 that extends away from the outer surface 110a of door 110. When installed on CNC machine 10, door handle 114 also extends away from CNC machine 10. Preferably, door handle 114 extends along the length of upper edge 110c and is integrally formed with door 110. More preferably, door handle 114 extends between about 1.4 inches and 1.5 inches at about a 110-degree angle relative to door 110 and has rounded outer corners. Alternatively, door handle 114 can extend at a 90-degree angle or have multiple sections extending at varying angles for comfort, convenience, efficiency, or necessity as will be understood by those skilled in the art.

Figure 20:
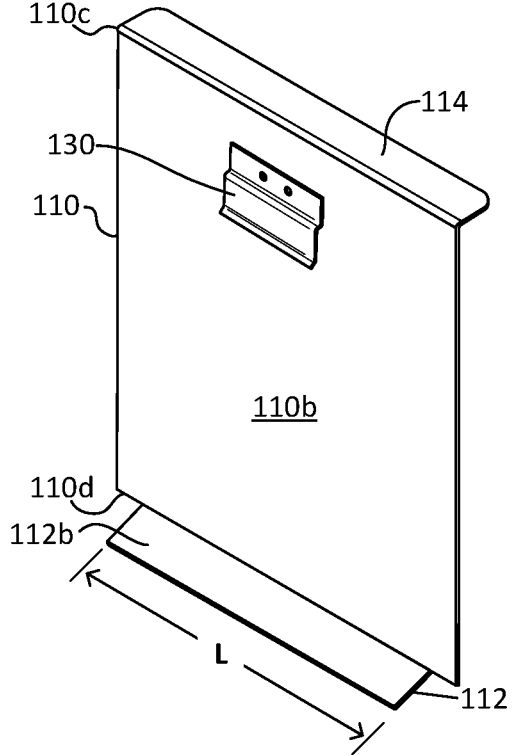
FIG. 20 is a perspective view of the deflector apparatus door before the basket is installed, the door being configured according to the preferred embodiment of the deflector apparatus of the present invention.
Figure 21:
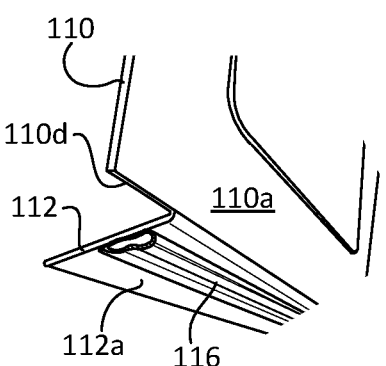
FIG. 21 is a bottom perspective view of the flange and seal of the deflector apparatus according to the preferred embodiment of the deflector apparatus of the present invention.

Along lower edge 110d of door 110 is flange 112 that extends below basket 120 and away from the inner surface 110c of door 110 in the same direction that basket 120 extends relative to door 110. Flange 112 extends in a direction opposite from the door handle 114 and into coolant collection area 20 when deflector apparatus 100 is installed on CNC machine 10. Preferably flange 112 extends along a portion of lower edge 110d of door 110, is centered along lower edge 110d of door 110, and is integrally formed with door 110. Also preferably, flange 112 has a length L as shown in FIG. 20, wherein L corresponds to the width W of opening 24 as shown in FIG. 5 such that flange 112 can fit within and rest on a lower edge 24a of opening 24. More preferably, flange 112 has an L of approximately 10.75 inches and extends between about 1.4 inches and 1.5 inches away from door 110 at a decline relative to ground or the horizon. As shown in FIG. 15B, flange 112 slopes downward at an angle B, which is preferably less than 90 degrees, particularly less than 45 degrees. Flange 112 has an inner surface 112b that connects with inner surface 110b of door 110. Flange 112 has an outer surface 112a that connects with outer surface 110a of door 110.

Preferably, securely fastened on outer surface 112a of flange 112 is a seal 116 that extends along the entire or the majority of the length of flange 112. Optionally, seal 116 is a plurality of seals positioned along the outer surface 112a of flange 112. Preferably seal 116 is secured to flange 112 with adhesive, but other methods of fastening a seal to a part can be used as will be understood by those skilled in the art. Seal 116 preferably is a silicone seal although any type of seal useful for preventing the flow of liquids and debris can be used as will be known by those skilled in the art. Seal 116 is shown in detail in FIGS. 10, 11, 14, and 21. When debris deflector 100 is installed on CNC machine 10, seal 116 rests on part of the opening 24 to coolant collection area 20 and operatively forms a seal between door 110 and that portion of opening 24. FIG. 15B illustrates how seal 116 interacts with opening 24 of coolant collection area 20.

Preferably, a lock extension 130 securely fastens to the inner surface 110b of door 110 at a location that permits cooperation with lock opening 26 on housing 18 of CNC machine 10. A preferred embodiment of lock extension 130 is shown in detail in FIGS. 18-20. Lock extension 130 can be made of sheet metal or another rigid material and is permanently attached to door 110. For example, where door 110 and lock extension 130 are both made of sheet metal, they can be attached together with spot well, rivet, or solder.

Figure 19:
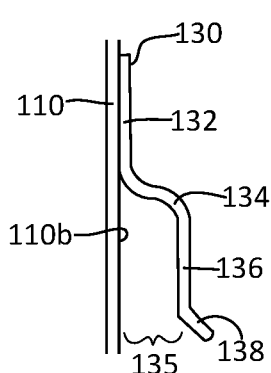
FIG. 19 is a side view of the locking tab as installed on the deflector apparatus's door according to the preferred embodiment of the deflector apparatus of the present invention.

As shown, lock extension 130 includes an attachment section 132, a catch section 136 that is integrally formed at a spaced distance from attachment section 132 via an integrally formed spacer section 134 to create a slot 135, and an optional but preferred lip section 138 integrally formed at an angle relative to catch section 136 as shown in the Figures. Lock extension is sized such that it fits within lock opening 26 of the CNC machine housing 18. In the preferred embodiment and when formed into its preferred shape as shown, the longer edge or width of the lock extension 130 is about 2.75 inches. The shorter sides of the attachment section plus one half of the spacer section combined are about 0.75 inches long. The shorter sides of the catch section 136 plus the one half of the spacer section 134 and the lip section 138 combined are about 1 inch long. The spacer section is preferably about 0.2 inches-0.21 inches long to create a sufficient gap or space between catch section 136 and door 110 when lock extension 130 is attached to door 110 to create slot 135 as shown in FIG. 19. Lip section 138 is preferably about 0.187 inches long.

When installing deflector apparatus 100, lock extension is inserted into lock opening 26 and then lowered such that when flange 112 and seal 116 rests on opening 24 to coolant collection area 20, the edge of lock opening 26 fits into slot 135 and the catch section 136 of lock extension 130 prevents sits inside CNC machine housing 18 and causes door 110 to rest up against housing 18. Accordingly, catch section 136 of lock extension 130 must be spaced at a distance substantial enough to create a slot 135 that can accommodate the thickness of CNC machine housing 18. While a lock extension 130 as shown is preferred, it can vary in size and shape as will be understood by those skilled in the art. Additionally, other locks can be substituted if desired. For example, a twist or turn lock can be installed on door 110 that twists into place once the door 110 is positioned as desired relative to CNC machine housing 18, a keyed lock assembly can be installed between housing 18 and door 110 where additional security is desired, or other types of cooperating latches, catches, and/or bars can be used.

Figure 17:
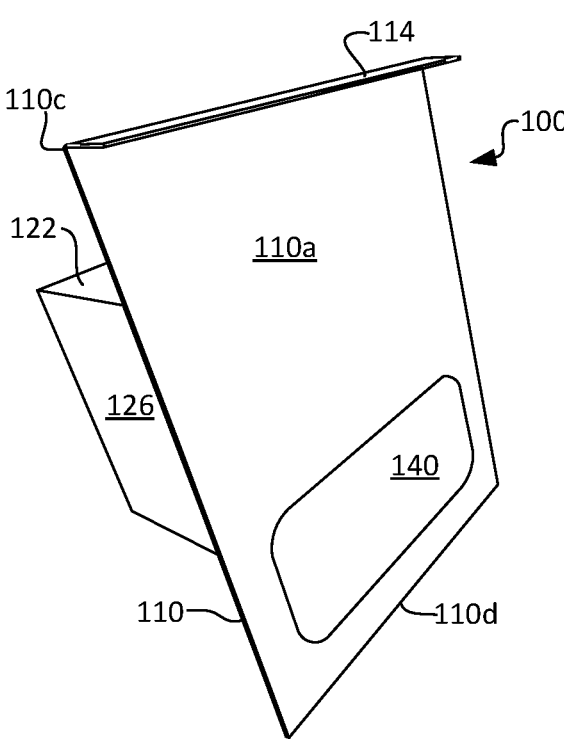
FIG. 17 is a front perspective view of the deflector apparatus of the present invention installed thereon.
Figure 18:
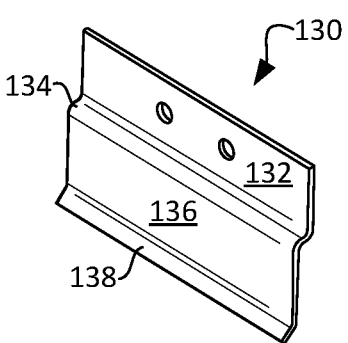
FIG. 18 is a perspective view of the locking tab of preferred embodiment of the deflector apparatus of the present invention.

Because the weight of basket 120 can put stress on door 110 when attached, optional reinforcement features can be included on door 110. Preferably, door 110 includes an optional reinforcing plate 140 installed on its outer surface 110*a*. As shown in FIGS. 11 and 17, reinforcing plate 140 extends across a portion of door 110. Preferably, reinforcing plate 140 is positioned relative to door 110 such that it extends across its outer surface 110*a* at substantially the same location where lower wall 124 of basket 120 attaches to the inner surface 110*b* of door 110. More preferably, reinforcing plate 140 extends above and below that same area such that it strengthens door 110 both when basket 110 is empty and when filled with debris 50. Reinforcing plate 140 can be any material that strengthens the door and is preferably sheet metal that is attached to the outer surface 110*a* of door 110 by spot weld, rivet, or soldering. Also preferably, reinforcing plate is rectangular shaped with rounded corners having longer sides about 10 inches long and shorter sides about 4 inches long.

For the preferred embodiment of basket 120, the open edges 122*n*, 124*n*, and 126*n* of upper wall 122, lower wall 124, and side walls 126 respectively are about 8 inches in length. Likewise, the door edges 122*m*, 124*m*, and 126*m* of upper wall 122, lower wall 124, and side walls 126 respectively are about 8 inches in length. Upper edge 126*j* and lower edge 126*k* of side walls 126 are about 8.25 inches in length. Likewise, side edges 122*j* and 124*k* of upper wall 122 and lower wall 124 respectively are about 8.25 inches in length. While these dimensions are preferred, the basket can be sized larger or smaller depending on the machine on which it is installed, as will be known to those skilled in the art. The length of side edges 122*j* and 124*k* of upper wall 122 and lower wall 124 and of the upper edge 126*j* and lower edge 126*k* of side walls 126 will depend partly on the angle A shown in FIG. 15A.

To use deflector apparatus 100, a machine operator places it over the opening 24 to coolant collection area 20 such that lower flange 112 and seal 116 rest on part of opening 24 and lock extension 130 fits within lock opening 26 of CNC machine housing 18. Once installed, the machine operator can machine a workpiece according to the operational and safety instructions of the CNC machine 10. When finished or when concerned that significant debris 50 may have accumulated in deflector apparatus 100, the machine operator preferably turns off CNC machine 10 and carefully lifts the deflector apparatus up and out of its position on and in coolant collector 20. Once removed, basket 120 of deflector apparatus 100 can be emptied into a waste or recycling receptacle. Optionally, the machine operator can also flush grate 124*a* with air or water to remove any debris that might have accumulated in or around grate 124. After emptying basket 120, the machine operator can reinstall deflector apparatus 100 on CNC machine 10. Using deflector apparatus 100 as described allows a machine operator to easily and efficiently remove unwanted debris from the coolant collection area 20.

While in the foregoing, embodiments of the present invention have been set forth in considerable detail for the purposes of making a complete disclosure of the invention, it may be apparent to those of skill in the art that many changes may be made in such detail without departing from the spirit and principles of the invention.

I claim:

1. A deflector apparatus for catching debris and deflecting coolant spray in a coolant collection area of a machine tool, the apparatus comprising:

a) a substantially vertical door sized to enclose the coolant collection area of the machine tool, the door comprising an outer surface, an inner surface, and a lower edge;

b) a basket fixedly attached to the inner surface of the door and extending away from the inner surface of the door at an incline relative to the ground, wherein the basket comprises a lower wall defining a grate;

c) a flange having an outer surface connected to the outer surface of the door, wherein the flange extends from the lower edge of the vertical door below the basket; and d) a seal fixedly attached to the outer surface of the flange.

2. The deflector apparatus of claim 1 further comprising a handle extending from the outer surface of the door.

3. The deflector apparatus of claim 1 further comprising a locking apparatus configured to selectively secure the door to the machine tool.

4. The deflector apparatus of claim 3 wherein the locking apparatus comprises a lock extension attached to the inner surface of the door, wherein a slot is defined by the inner surface of the door and the lock extension, the slot configured such that the slot receives an edge of a wall of the machine tool.

5. The deflector apparatus of claim 1 further comprising a reinforcement plate attached to the outer surface of the door.

6. The deflector apparatus of claim 1 wherein the grate comprises a plurality of openings defined by the basket lower wall and configured to facilitate fluid communication between the basket and the coolant collection area.

7. The deflector apparatus of claim 6 wherein each of the openings is between 0.07 and 0.09 inches in diameter.

8. The deflector apparatus of claim 1 wherein the basket extends away from the inner surface of the door at an incline of 10 degrees relative to the ground.

9. The deflector apparatus of claim 1 wherein the basket defines a basket opening that is configured to accept part of a spindle assembly that is disposed in the coolant collection area.

10. The deflector apparatus of claim 1 wherein the basket comprises a parallelepiped shape.

11. The deflector apparatus of claim 10 wherein the basket further comprises:

a) a substantially planar first wall;

b) a substantially planar first side wall attached to the lower wall;

c) a substantially planar second side wall that is substantially parallel to the first side wall and that is attached to the lower wall at a spaced distance from the first side wall; and d) a substantially planar upper wall that is substantially parallel to the lower wall and that is attached to the first and second side walls at a spaced distance from the lower wall.

12. The deflector apparatus of claim 11 wherein the lower wall of the basket is inclined 10 degrees relative to the ground.

13. The deflector apparatus of claim 1 wherein the flange extends away from the inner surface of the door at a decline relative to the ground.

14. The deflector apparatus of claim 13 wherein the flange extends away from the inner surface of the door at a decline of less than 45 degrees relative to the ground.

15. The deflector apparatus of claim 14 wherein the flange has a first length, and the seal has a first length substantially equal to the first length of the flange.

16. A deflector apparatus for catching debris and deflecting coolant spray in a coolant collection area of a machine tool, the apparatus comprising:

a) a substantially vertical door sized to enclose the coolant collection area of the machine tool, the door comprising an outer surface, an inner surface, and a lower edge;

b) a basket comprising:

i) a substantially planar lower wall attached to the inner surface of the door at an incline relative to the ground, the lower wall defining a plurality of openings configured to facilitate fluid communication between the basket and the coolant collection area;

ii) a substantially planar first side wall attached to the lower wall and attached substantially perpendicularly to the inner surface of the door; and iii) a substantially planar second side wall attached to the lower wall at a spaced distance from the first side wall and attached substantially perpendicularly to the inner surface of the door;

c) a flange having an outer surface connected to the outer surface of the door, wherein the flange extends from the lower edge of the vertical door below the basket; and d) a seal fixedly attached to the outer surface of the flange.

17. The deflector apparatus of claim 16 wherein the basket further comprises a substantially planar upper wall attached to the inner surface of the door at an incline relative to the ground and attached to the first and second side walls at a spaced distance from the lower wall.

18. The deflector apparatus of claim 17 wherein the lower wall of the basket attaches to the inner wall of the door at an incline of 10 degrees relative to the ground.

19. The deflector apparatus of claim 18 wherein the upper wall of the basket attaches to the inner wall of the door at an incline of 10 degrees relative to the ground.

20. The deflector apparatus of claim 19 wherein the basket first side wall, the basket second side wall, the basket upper wall, the basket lower wall, and a part of the inner surface of the door together define a basket cavity that is configured to accept part of a spindle assembly that is disposed in the coolant collection area.

* * * * *